(12) United States Patent
Huynh-Thu et al.

(10) Patent No.: US 9,311,533 B2
(45) Date of Patent: Apr. 12, 2016

(54) DEVICE AND METHOD FOR DETECTING THE PRESENCE OF A LOGO IN A PICTURE

(71) Applicant: THOMSON LICENSING, Issy de Moulineaux (FR)

(72) Inventors: Thai Q Huynh-Thu, Rennes (FR); Fabrice Urban, Thorigne Fouillard (FR)

(73) Assignee: Thomson Licensing, Issy-les-Moulineaux (FR)

( * ) Notice: Subject to any disclaimer, the term of this patent is extended or adjusted under 35 U.S.C. 154(b) by 54 days.

(21) Appl. No.: 14/028,425

(22) Filed: Sep. 16, 2013

(65) Prior Publication Data

US 2014/0079321 A1    Mar. 20, 2014

(30) Foreign Application Priority Data

Sep. 17, 2012    (EP) .................................... 12306113

(51) Int. Cl.
*G06K 9/46*    (2006.01)
*G06K 9/00*    (2006.01)

(52) U.S. Cl.
CPC .......... *G06K 9/0053* (2013.01); *G06K 9/00711* (2013.01); *G06K 2209/25* (2013.01)

(58) Field of Classification Search
CPC ....................... G06K 9/00711; G06K 2209/25
See application file for complete search history.

(56) References Cited

U.S. PATENT DOCUMENTS

| | | | |
|---|---|---|---|
| 7,599,558 B2 | 10/2009 | Yeh et al. | |
| 8,175,413 B1 * | 5/2012 | Ioffe et al. | 382/283 |
| 2007/0052854 A1 * | 3/2007 | Yeh et al. | 348/565 |
| 2008/0138030 A1 * | 6/2008 | Bryan et al. | 386/52 |
| 2009/0251613 A1 * | 10/2009 | Kervec et al. | 348/700 |
| 2009/0324088 A1 * | 12/2009 | Chamaret et al. | 382/195 |
| 2010/0189368 A1 * | 7/2010 | Des Jardins et al. | 382/218 |

FOREIGN PATENT DOCUMENTS

| | | |
|---|---|---|
| EP | 1695288 | 6/2005 |
| EP | 2141658 | 1/2010 |
| JP | 2007299144 | 11/2007 |

OTHER PUBLICATIONS

Jinqiao Wang et al: "A Robust Method for TV Logo Tracking in Video Streams", 2006 IEEE International Conference on Multimedia and Expo (ICME 2006), Toronto, Ont., Canada, IEEE, Piscataway, NJ, USA, Jul. 1, 2006, pp. 1041-1044.*

(Continued)

*Primary Examiner* — Bhavesh Mehta
*Assistant Examiner* — Ian Lemieux
(74) *Attorney, Agent, or Firm* — Myers Wolin LLC

(57) ABSTRACT

A method for detecting the presence of a logo in a current picture of a video is disclosed. The method comprises:
  determining a current candidate logo bounding box in the current picture and a preceding candidate logo bounding box in a picture preceding the current picture;
  detecting the presence of a logo in the current picture if at least one of the following conditions is fulfilled:
  the distance between the centers of the current and the preceding candidate logo bounding boxes is below a first threshold or an overlap between the current and the preceding candidate logo bounding boxes is above a second threshold; or
  an overlap between the current candidate logo bounding box and a saliency mask of the current picture is above a third, wherein the saliency mask identifies regions around saliency peaks.

18 Claims, 10 Drawing Sheets

(56) References Cited

OTHER PUBLICATIONS

Esen etal: "A fast method for animated TV logo detection", Content-based multimedia indexing, 2008. CBMI 2008. International workshop on, IEEE, Piscataway, NJ, USA, Jun. 18, 2008, pp. 236-241, XP031286370, ISBN: 978-1-4244-2043-8, paragraph [02.2].

Ozay etal: "Automatic TV logo detection and classification in broadcast videos", Proceedings of the 17th european signal processing conference, Aug. 24-27, 2009, pp. 839-843, XP002693700, figure 2.

Jinqiao Wang etal: "A robust method for TV logo tracking in video streams", 2006 IEEE international conference on multimedia and expo (ICME 2006), Toronto, Ont., Canada, IEEE, Piscataway, NJ, USA, Jul. 1, 2006, pp. 1041-1044, XP031033017, ISBN: 978-1-4244-0366-0.

Search Report Dated Mar. 15, 2013.

Cozar et al., "Video cataloging based on robust logotype detection", 2006 IEEE International Conference on Image Processing, Atlanta, Georgia, USA, Oct. 8, 2006, pp. 3217-3220.

Wang et al., "Logo detection in document images based on boundary extension of feature rectangles", 2009 10th International Conference on Document Analysis and Recognition (ICDAR), Barcelona, Spain, Jul. 26, 2009, pp. 1335-1339.

\* cited by examiner

DEVICE AND METHOD FOR DETECTING THE PRESENCE OF A LOGO IN A PICTURE

This application claims the benefit, under 35 U.S.C. §119 of European Patent Application 12306113.7, filed Sep. 17, 2012.

1. FIELD OF THE INVENTION

The invention relates to picture processing. More particularly the invention relates to a method and a corresponding device for detecting the presence of a logo in a picture of a sequence of pictures. The method further makes it possible to determine more precisely the logo (i.e. its position).

2. BACKGROUND OF THE INVENTION

Logo detection in pictures is of interest for several applications. As an example, such detection is used in a retargeting device in order to avoid including part of the logo in the retargeted picture. Others applications require the logo to be removed from the pictures. As an example, a program initially broadcasted on a TV channel (e.g., sports game) can be accessed later in catch-up mode on the same channel or can be sold to another TV channel for highlights. In the former case, the TV channel logo is usually removed to be replaced by a specific logo indicating that the program is in catch-up mode. In the latter case, the logo of the first TV channel is removed before the program is shown on the second TV channel.

It is known from European patent application published on Jan. 6, 2012 as EP2141658 to detect a logo in a picture using only saliency information. More precisely, a logo is roughly detected in search areas in the pictures based on saliency information. The search areas are for example the four corners of the picture. This solution can only handle the simplest case of static opaque logo with the constraint of the logo being present during the entire video segment to process. Furthermore, this solution fails when the logo is not the most visually salient area in the picture, for example when an object with high contrast is present in the picture.

On the other hand, it is known from a paper of Özay et al entitled "Automatic TV logo detection and classification in broadcast videos" published in EUSIPCO 2009 to detect a logo based on the accumulation of static edges over several pictures. More precisely, according to this method the edges are detected over N pictures. The edges are then accumulated over these N pictures. If N is high enough, the accumulated edges is a good information for detecting a logo. However, for a real-time application such as a video retargeting application, N cannot be high enough to get relevant information for logo detection.

3. BRIEF SUMMARY OF THE INVENTION

The purpose of the invention is to overcome at least one of the disadvantages of the prior art. To this aim, the invention relates to a method for detecting the presence of a logo in a current picture of a video comprising:
  determining a current candidate logo bounding shape in the current picture and a preceding candidate logo bounding shape in a picture preceding the current picture;
  detecting the presence of a logo in the current picture if at least one of the following conditions is fulfilled:
  the distance between the centers of the current and the preceding candidate logo bounding shapes is below a first threshold or an overlap between the current and the preceding candidate logo bounding shapes is above a second threshold; or
  an overlap between the current candidate logo bounding shape and a saliency mask of the current picture is above a third, wherein the saliency mask identifies regions around saliency peaks.

The logo detection is more robust.

According to a specific characteristic, the candidate logo bounding shape is a candidate logo bounding box.

Advantageously, a confidence level is increased by N each time the presence of a logo is detected for a current picture of the video and decreased by N otherwise, the presence of a logo being finally detected for the current picture when the confidence level is positive. This makes it possible to handle situation where the logo is appearing and disappearing during the video.

According to a specific characteristic, N equals 1.

According to another characteristic, the value of N is increased after several consecutive detections or non-detections are made.

According to another embodiment, when the presence of a logo is detected for the current picture, the logo in the current picture is determined as follows: check whether the current candidate logo bounding box comprises a peak of saliency and add the current candidate logo bounding box to a list of logo candidate bounding boxes if the check is positive, the logo in the current picture being a bounding box computed from the list of candidate logo bounding boxes when the list comprises M candidate logo bounding boxes and the logo in the current picture being the current candidate logo bounding box otherwise. The localization of the logo (size and position) is thus more stable over the video and precise.

According to a specific characteristic, M equals 10.

According to another aspect of the invention, determining the current candidate logo bounding box comprises:
  a) Computing an edge map for each picture of a detection window in at least one search area, the detection window comprising the current picture and P pictures preceding the current picture;
  b) summing edge maps over the pictures into an accumulated edge map and binarizing the accumulated edge map;
  c) Filtering the binarized accumulated edge map into a filtered edge map;
  d) Binarizing the filtered edge map to into a map of blobs;
  e) Selecting, among the blobs containing the pixels whose value in the filtered edge map is the highest, the blob containing the highest sum of pixel values in the filtered edge map; and
  f) Determining a box bounding the selected blob, the candidate bounding box being the bounding box.

Steps a) to f) helps in determining candidate bounding box even when the logo is transparent or semi-transparent.

Advantageously, the detection window is slided of k pictures and wherein the steps a) to f) are repeated on the slided detection window to detect a logo for one picture of the slided detection window, called next picture.

According to another aspect of the invention, the at least one search area comprises the four corners of the current picture and top and bottom horizontal banners.

The invention further relates to a device for detecting the presence of a logo in a current picture of a video comprising:
  a module configured to determine a current candidate logo bounding shape in the current picture and a preceding candidate logo bounding shape in a picture preceding the current picture;

a module configured to detect the presence of a logo in the current picture if at least one of the following conditions is fulfilled:

the distance between the centers of the current and the preceding candidate logo bounding shapes is below a first threshold or an overlap between the current and the preceding candidate logo bounding shapes is above a second threshold; or an overlap between the current candidate logo bounding shape and a saliency mask of the current picture is above a third, wherein the saliency mask identifies regions around saliency peaks.

According to a specific characteristic, the candidate logo bounding shape is a candidate logo bounding box.

Advantageously, the device comprises a module configured to increase a confidence level by N each time the presence of a logo is detected for a current picture of the video and for decreasing the confidence level by N otherwise, the presence of a logo being finally detected for the current picture when the confidence level is positive.

According to a specific characteristic, N equals 1.

According to a specific characteristic, the value of N is increased after several consecutive detections or non-detections are made.

According to another aspect of the invention, the device comprises a module configured to determine a logo in the current picture when the presence of the logo is detected, wherein the a module configured to determine a logo check whether the current candidate logo bounding box comprises a peak of saliency and add the current candidate logo bounding box to a list of logo candidate bounding boxes if the check is positive, the logo in the current picture being a bounding box computed from the list of candidate logo bounding boxes when the list comprises M candidate logo bounding boxes and the logo in the current picture being the current candidate logo bounding box otherwise.

According to a specific characteristic, M equals 10.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE INVENTION

The invention relates to a method for detecting the presence of a logo in a video. The logo is of arbitrary shape. A map is a picture in which information other than luminance or chrominance is associated with pixels, e.g. saliency information, gradient information, etc.

Figure 1:
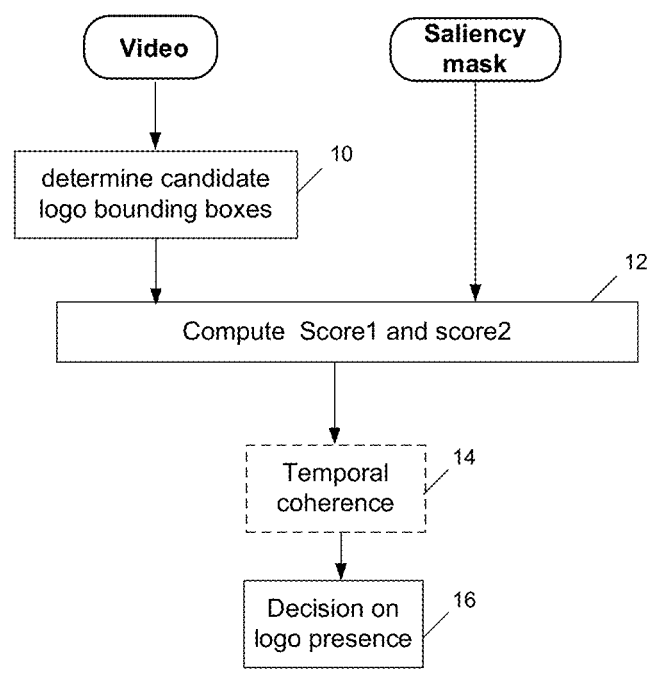
FIG. 1 represents the flowchart of a method for detecting the presence of a logo in a video according to a first embodiment of the invention.

FIG. 1 represents the flowchart of method for detecting the presence of a logo according to a first embodiment of the invention.

In a step 10, a candidate logo bounding box is determined in a current picture I(t) and another one in the picture I(t−1) preceding said current picture. The invention is not limited by the way the candidate logo bounding boxes are determined. As a first example, the candidate logo bounding boxes are determined manually by an operator. According to a variant, the candidate logo bounding boxes are determined according to a picture processing method such as the one described with reference to FIG. 9. A candidate logo bounding box represents the bounding box of an area of the image that is determined to potentially be a logo. The bounding box of an area is the smallest rectangle including the area.

In a variant, the candidate logo bounding box is replaced by an arbitrary shape, provided a center can be determined for this shape. As an example, the arbitrary shape is a circle, a triangle, a rhombus, a quadrilateral. Consequently, in the step 10, a candidate logo bounding shape is determined in a current picture I(t) and another one in the picture I(t−1) preceding said current picture. The candidate logo bounding shape represents the shape of an area of the image that is determined to potentially be a logo.

In a step 12, two scores are computed based on the candidate logo bounding boxes and further based on a saliency mask of the current picture I(t). The invention is not limited by the way the saliency mask is determined. The saliency mask is a picture that identifies the saliency peaks. As a first example, the saliency mask is obtained by thresholding a saliency map. The saliency mask is thus a binary picture wherein the most salient pixels have a first value (e.g. the value 255) while all the other pixels have another value (e.g. the value 0). A saliency map is a picture that associates a saliency value with each pixel of the picture. A saliency value represents the visual importance of the pixel. The more visually attractive pixels have higher saliency values. A saliency map thus makes it possible to identify in a picture regions of visual interest. Usually a saliency map is determined based on the modeling of visual system. Such a visual attention model was patented in EP patent application 04804828.4 published on Jun. 30, 2005 under number 1695288. According to a variant, the saliency mask is determined according to a picture processing method such as the one described with reference to FIG. 12.

Figure 2:
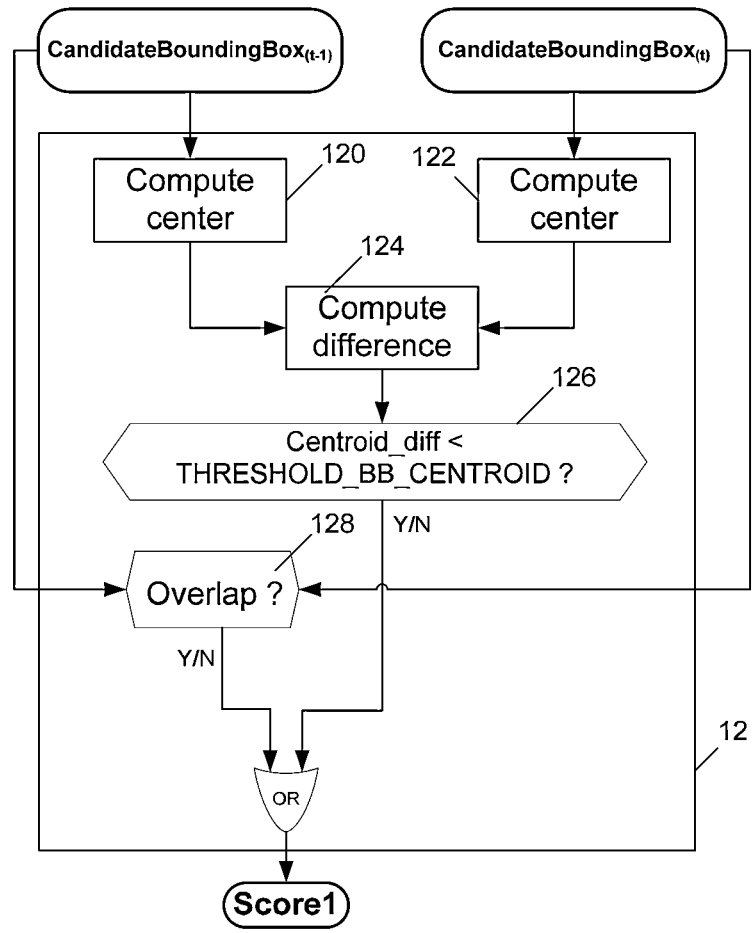
FIGS. 2 and 3 represent details of the flowchart of the method according the first embodiment of the invention.

According to this embodiment, the value of both scores is binary. Score1 is computed as depicted on FIG. 2 by using information on the candidate logo bounding boxes for the current picture and for the preceding picture. At a step 120, the center of the current candidate logo bounding box is computed. At a step 122, the center of the preceding candidate logo bounding box is computed. At a step 124, the spatial distance between both centers is computed. As an example, the distance is computed using the square root of $(x-x')*(x-x')+(y-y')*(y-y)$, where $(x,y)$ and $(x',y')$ are the coordinates of the center of the current and preceding bounding box respectively. At a step 126, this difference is compared to a threshold value THRESHOLD_BB_CENTROID. At a step 128, the two candidate logo bounding boxes are compared to check whether there is a sufficient overlap between both candidate logo bounding boxes. If there is a sufficient overlap or if the difference computed at step 124 is below THRESHOLD_BB_CENTROID then score1=1, otherwise score1=0. When score1=1, this means that the center of the candidate logo bounding box do not change too much between consecutive pictures. An overlap between two candidate logo bounding boxes is sufficient if the number of pixels in common is above a threshold value. As an example, a threshold value of 1 is used to decide of the existing overlap between the bounding boxes. However, this threshold value can be advantageously set to a higher value in order to set a stricter constraint on the overlap test.

Figure 3:
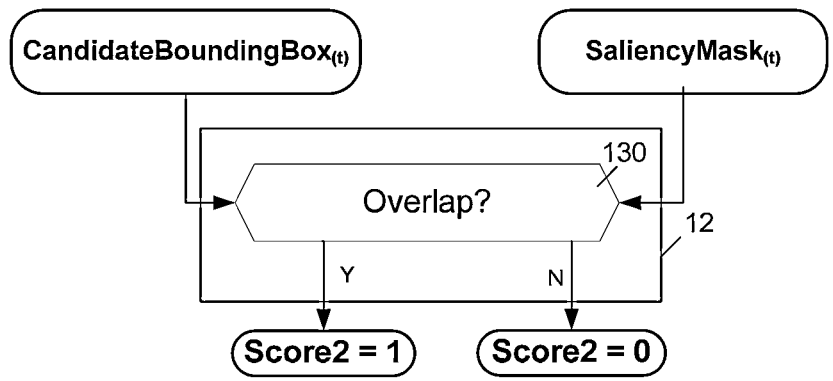

Score2 is computed as depicted on FIG. 3. At a step 130, the current candidate bounding box is compared with the current saliency mask to check whether there is a sufficient overlap between both of them. If the overlap is sufficient then score2=1 otherwise score2=0. The overlap is sufficient if the number of pixels in common between the current candidate bounding box and the saliency mask is higher than a threshold value. The threshold value is the same as the one used for step 128.

In a step 16, the logo's presence is detected based on the value of the scores computed at step 12. If score1=1 or score2=1, then the presence of a logo is detected in the current picture otherwise no logo is detected.

According to a variant, the method of FIG. 1 further comprises a step 14 for checking the decision of logo's presence.

Figure 4:
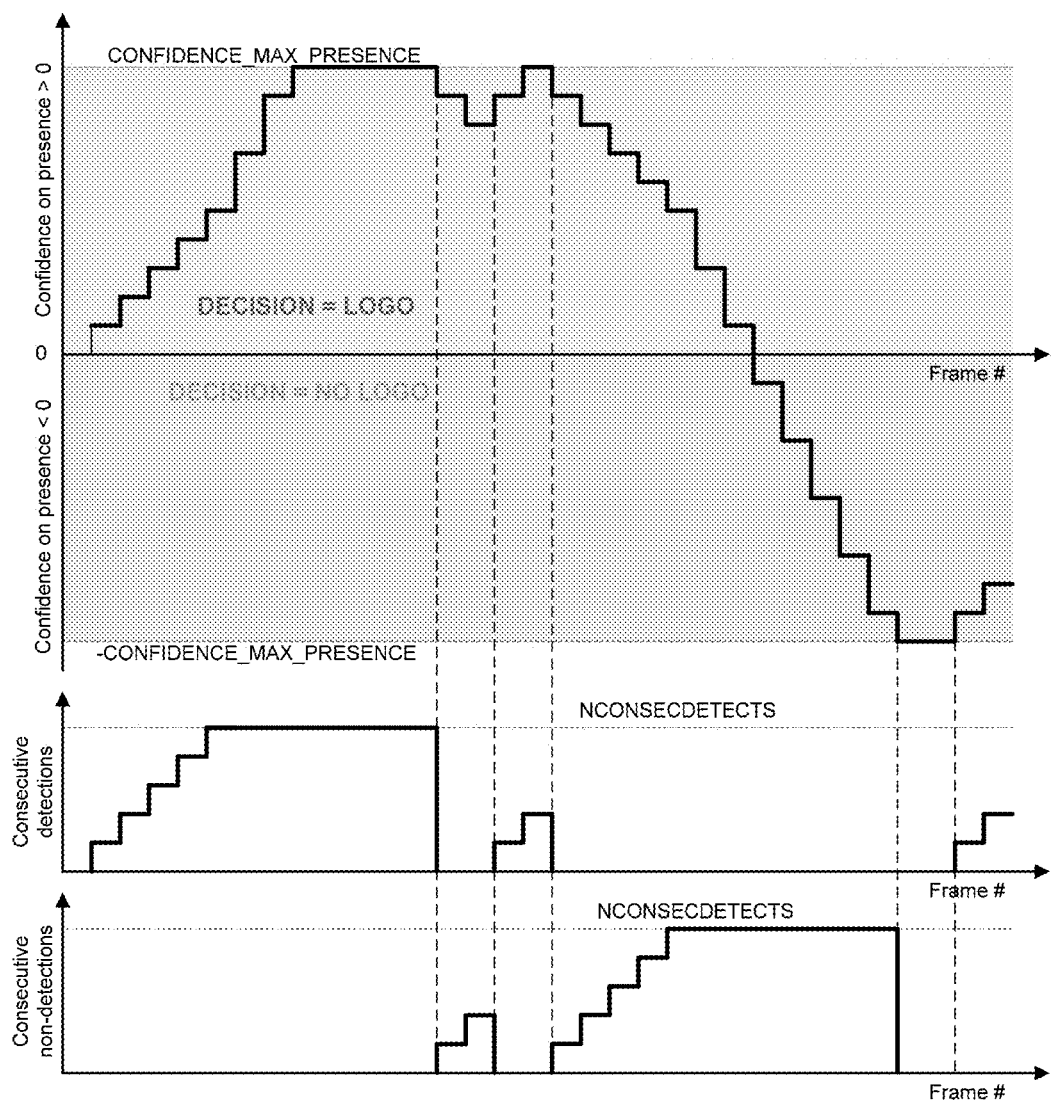
FIG. 4 illustrates the principle of temporal coherence according to the invention.

In the optional step 14, temporal coherence is checked as depicted on FIG. 4 before the final decision on logo's presence is taken. An initial temporary decision on logo presence is taken based on the values of Score1 and Score2 More precisely, If score1=1 or score2=1, then the presence of a logo is detected in the current picture otherwise no logo is detected. However, final decision is made after integration of temporal coherence. The temporal coherence is based on the following principles:

If the initial temporary decision for the current picture has lead to a positive answer (a logo has been detected because either score1 or score2 equals 1), this decision is checked against a history of past decisions in order to decide whether the detection result for the current picture is a true detection or a false positive.

If the initial temporary for the current picture has lead to a negative answer (no logo has been detected), this decision is checked against a history of past decisions in order to decide whether the detection result for the current picture is a true negative or a false negative.

To this aim, a confidence level is computed. The confidence level is increased by N each time the presence of a logo is detected for a current picture and decreased by N otherwise, the presence of a logo being finally detected for the current picture when said confidence level is positive. Final decision is "no logo presence" as long as this confidence level remains null or negative. As an example, N=1.

According to a variant, when several detections of the presence of a logo are made consecutively, the confidence level on presence is increased more rapidly (e.g. N=2). When several non-detections are made consecutively, the confidence level on presence is decreased more rapidly.

Figure 5:
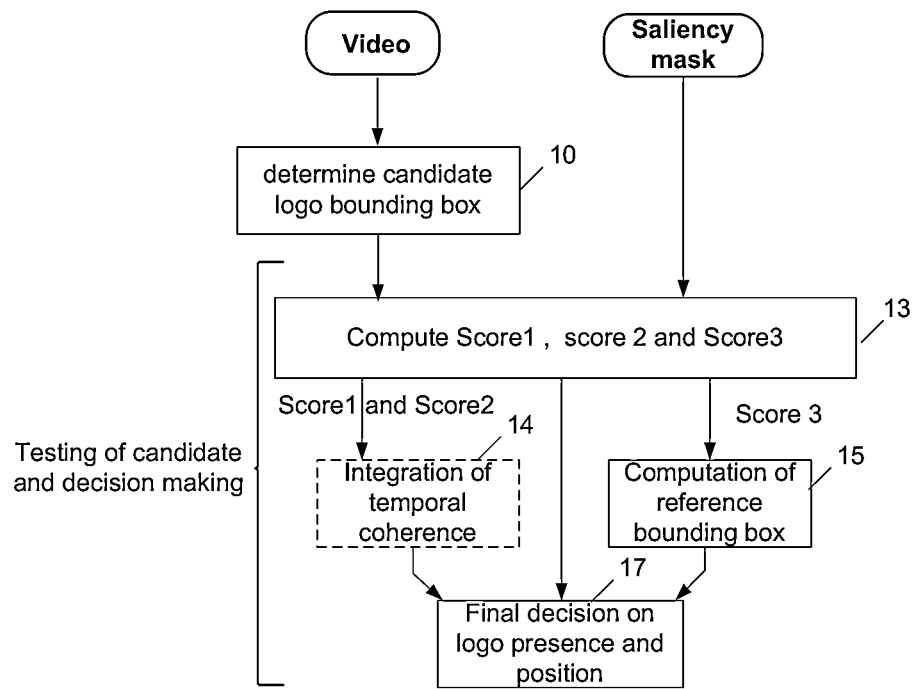
FIG. 5 represents the flowchart of a method for detecting the presence of a logo in a video according to a second embodiment of the invention.

FIG. 5 represents the flowchart of the method for detecting the presence of a logo according to a second embodiment of the invention. The steps that are identical to the steps of the method according to the first embodiment are identified on FIG. 5 with the same numerical references.

Figure 6:
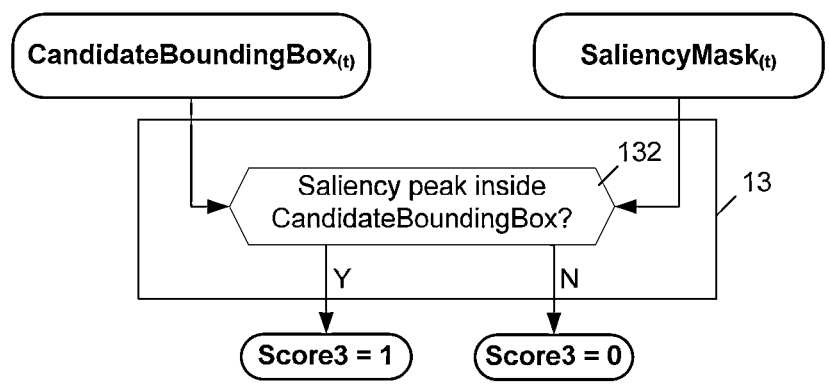
FIGS. 6, 7 and 8 represent details of the flowchart of the method according the second embodiment of the invention.

In a step 13 which replaces step 12 of the first embodiment, a third score is computed in addition to score1 and score2. Score1 and score2 are computed as in step 12. Score3 is computed as depicted on FIG. 6. At step 132, it is checked whether a peak of visual saliency exists inside the current candidate logo bounding box. If there is a saliency peak then score3=1 otherwise score3=0. Using this score makes it possible to reinforce the confidence on the detection decision obtained with other tests rather than drive the decision itself. This is based on the observation that logos are often but not always visually salient.

Figure 7:
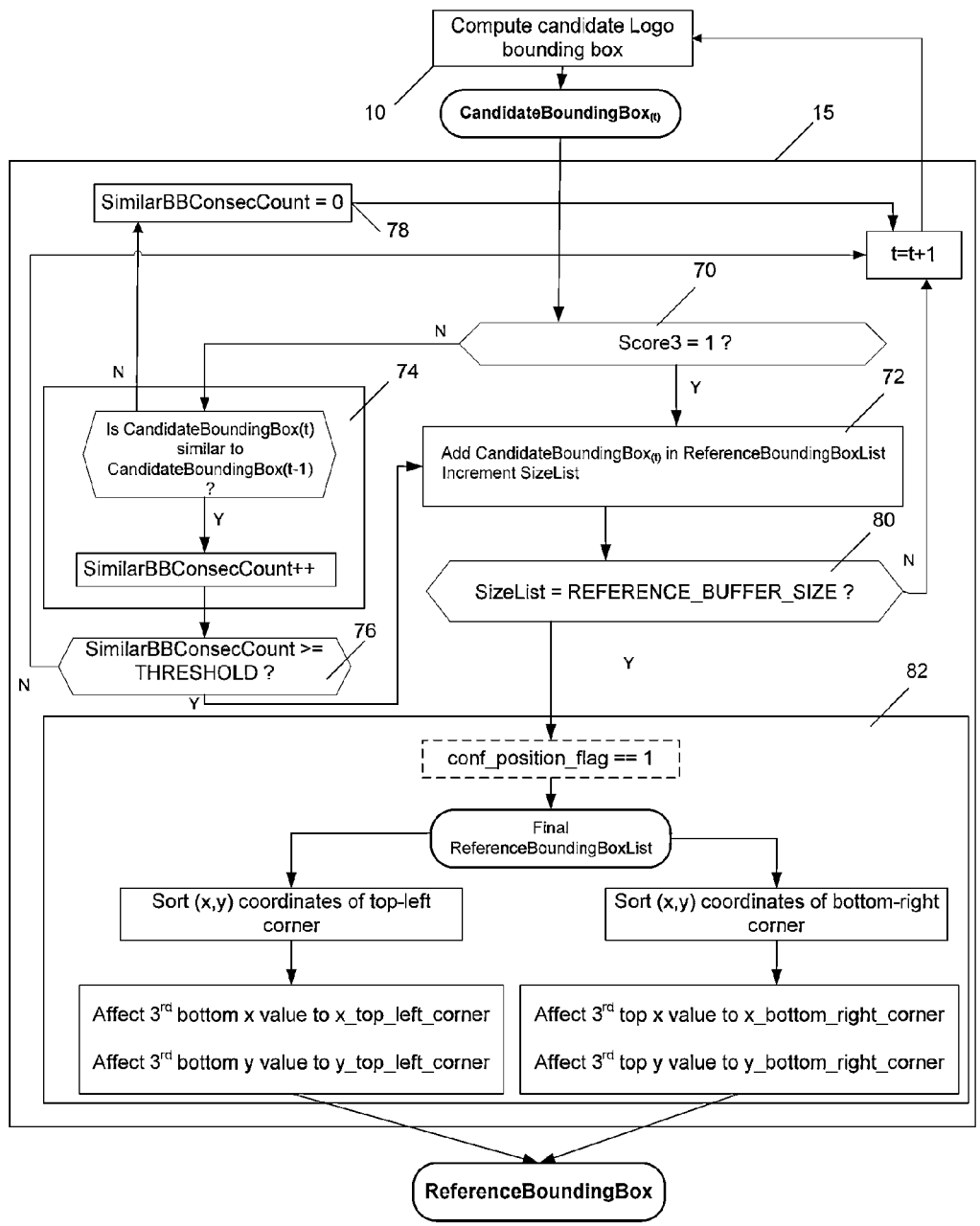

In a step 15, a reference bounding box is computed for the current picture as depicted on FIG. 7. A reference bounding box is computed by temporally storing information on confidence of logo presence and position. This is based on the idea that the logo size and position should remain identical over the sequence (even if the logo disappears and reappears later in the video).

Once a candidate bounding box has been found for the current picture, the value of the Score3 is used in a step 70:

If Score3=1: there is a higher confidence on the logo presence and the current candidate logo bounding box is added in a reference list in a step 72.

If Score3=0: a principle of temporal similarity is applied by incrementing at a step 74 a counter (SimilarBBConsecCount) of similar consecutive candidate logo bounding boxes when the candidate bounding box of the current picture is similar enough to the one of the previous picture. To determine the similarity between two candidate bounding boxes, the coordinates to the top-left and bottom-right corners of the two bounding boxes are compared. The bounding boxes are considered to be similar if both the spatial distances computed between the top-left corners on the one hand and between the bottom-right corners on the other hand are below a threshold. As an example, the threshold is set to be 5 pixels. Then, the counter value is compared at a step 76 with a threshold value THRESHOLD. If SimilarBBConsecCount>THRESHOLD, then the current candidate logo bounding box is added in the reference list at step 72. Otherwise, when dissimilarity is found between the current and previous candidate bounding boxes, the counter is reset to zero at a step 78.

At a step 80, the number of candidate bounding boxes present in the reference list, indicated by the value SizeList is compared with a threshold value REFERENCE_BUFFER_SIZE. REFERENCE_BUFFER_SIZE equals for example 10. When the number of candidate bounding boxes in the reference list reaches REFERENCE_BUFFER_SIZE, a reference bounding box is computed as it is decided that a logo has been detected with high confidence a sufficient number of times. Once a reference bounding box has been computed, every time a new candidate logo bounding box passes all the tests leading to the decision of logo presence, the coordinates of the reference bounding box are used instead of those of the current candidate logo bounding box. A flag conf_position_flag is set to 1 to indicate that the ReferenceBoundingBox has been computed and that there is no need to re-compute it in the subsequent processing. According to a variant, a ReferenceBoundingBox is re-computed in the subsequent processing. In this case, there is no need to set the flag conf_position_flag to 1.

The coordinates of the reference bounding box is computed from the list by sorting the x and y coordinates of the top-left and bottom-right corners, and selecting one of the value in the list, for example the $3^{rd}$ value. In an ideal scenario, the bounding boxes in the reference list are very similar and the resulting reference bounding box will also be very similar to the bounding boxes in the list (as the $3^{rd}$ value will be similar to the $1^{st}$ value). On the other hand, if the bounding boxes in the reference list are quite different, then this approach will select an area with very high overlap between the bounding boxes in the list. Another method to compute the reference bounding box is to compute an histogram of the coordinates of the bounding boxes in the reference list and consider the peak value for each coordinate.

Figure 8:
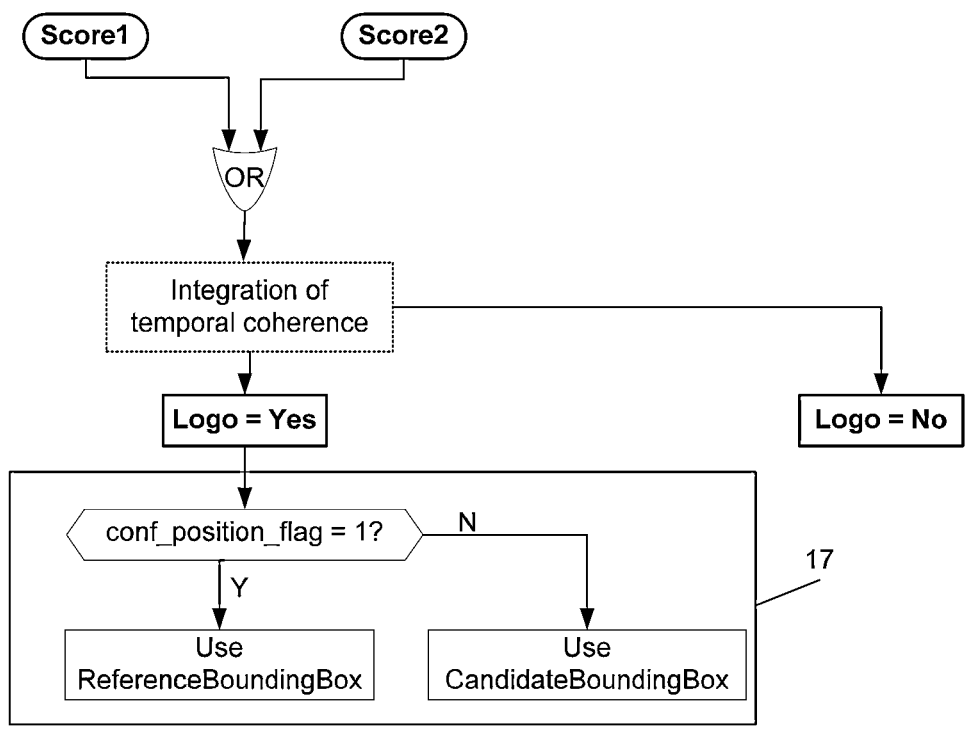

In a step 17, a final decision on logo presence and decision is taken as depicted on FIG. 8. The initial temporary decision on logo detection is based on the values of Score1 and Score2. However, final decision on logo presence is reached after integration of temporal coherence. If a reference bounding box is computed, then each time the decision on logo's presence produces a positive answer, the information of the reference bounding box overrides the information of the current candidate logo bounding box. Otherwise, the information of the current bounding box is used. Once a reference bounding box is computed, the same reference bounding box is used in the remaining pictures of the video when a logo is subsequently detected. According to a variant, a new reference bounding box is computed in the pictures following picture I(t).

Figure 9:
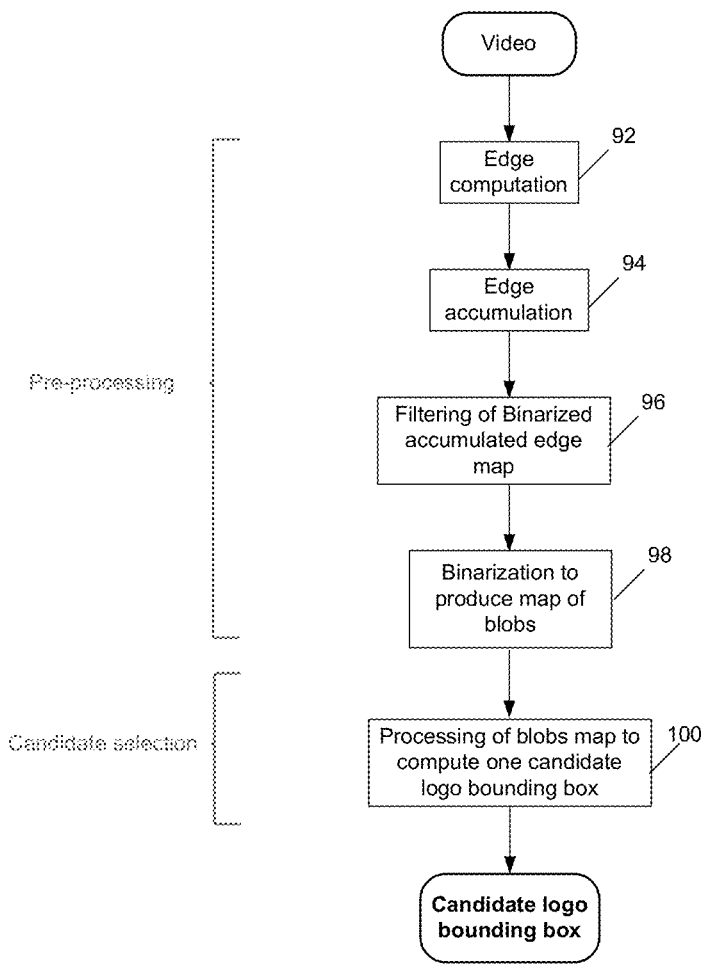
FIG. 9 represents the flowchart of a method for determining a candidate logo bounding box according to the invention.
Figure 10:
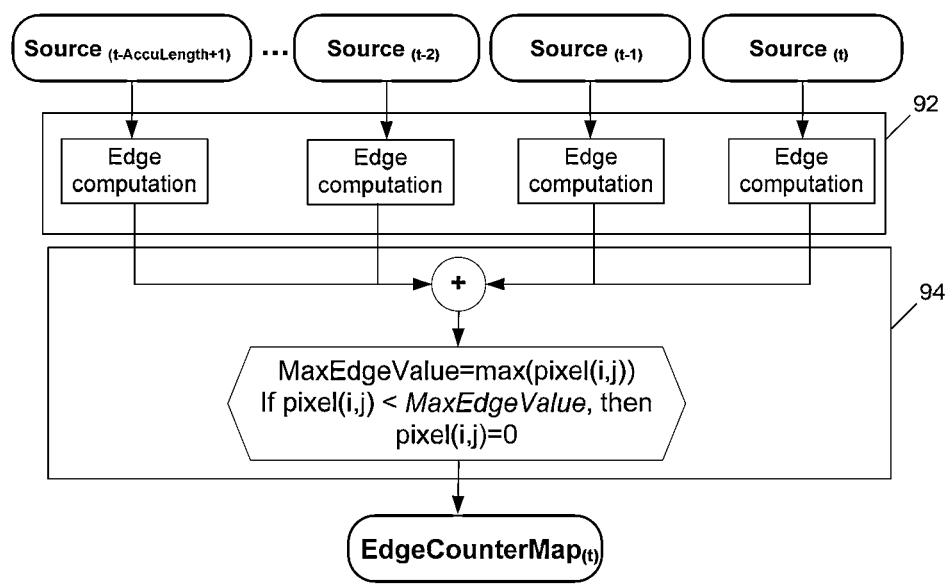
FIG. 10 represents a first detail of the flowchart of the method for determining a candidate logo bounding box according to the invention.
Figure 11:
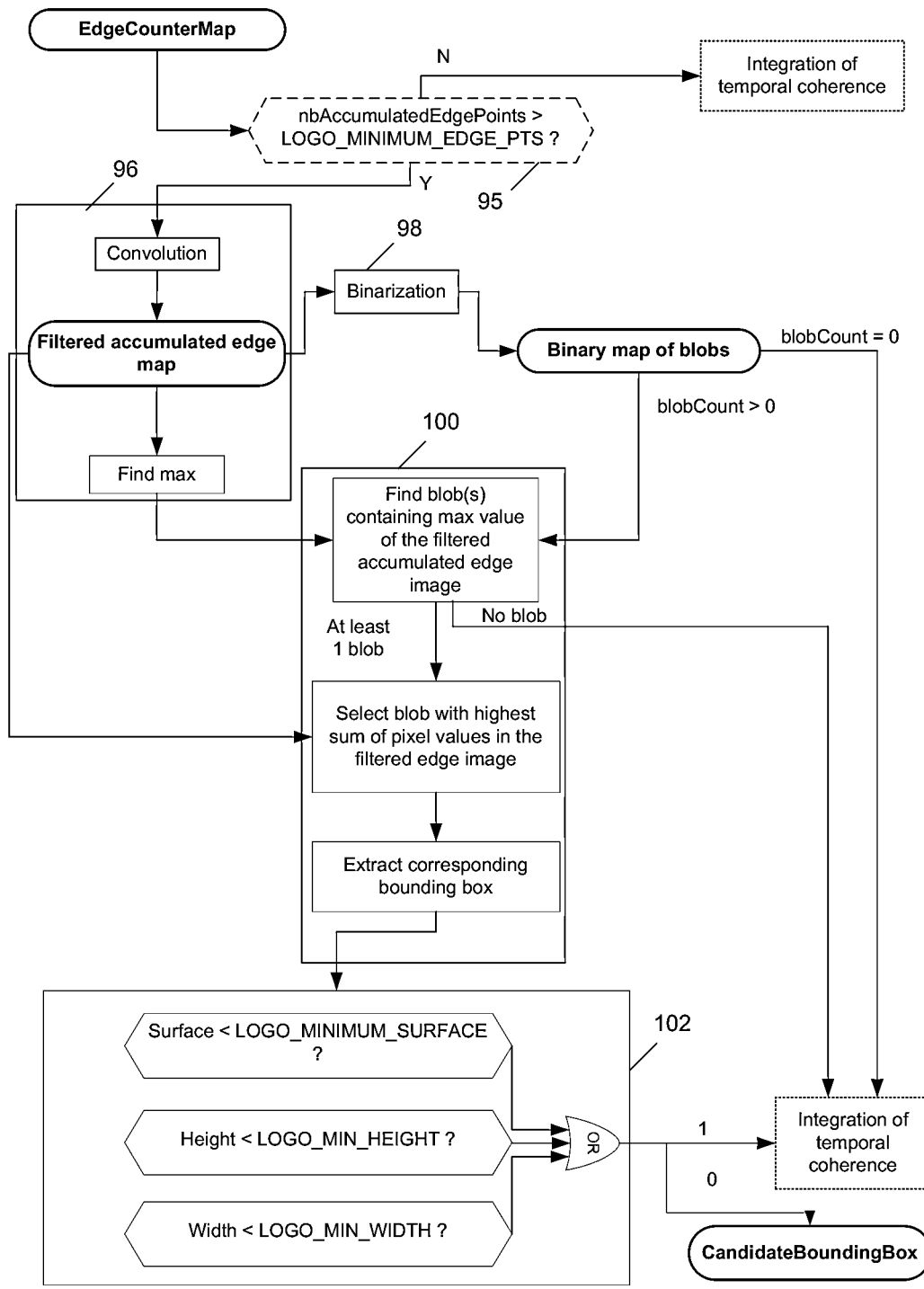
FIG. 11 represents a second detail of the flowchart of the method for determining a candidate logo bounding box according to the invention.

FIGS. 9, 10 and 11 represent the flowchart of a method for determining a candidate logo bounding box. In a step 92, an edge detector, e.g. a Sobel edge detector, is applied on the current picture and on (ACCU_LENGTH−1) pictures preceding the current picture. According to a variant, the edge detector is applied only on search area in the pictures, e.g. the four corners of the picture or the top and bottom horizontal banners. According to the variants, more robust and elaborated edge detectors are used, e.g. a Canny edge detector. Using more robust and elaborated edge detectors improves the detection of edges for the case of semi-transparent logos and logos with soft edges.

In a step 94, the binary maps of edges which are the outputs of the Sobel edge detector are then summed up into an accumulated edge map. The accumulated edge map is then binarized by considering only those pixels whose value is equal to the maximum summed value MaxEdgeValue in the accumulated edge map. According to a variant, the pixels with value equal to or higher than (K*ACCU_LENGTH) with for example K=0.8 are considered. Indeed, ACCU_LENGTH is the maximum theoretical accumulated value. In an optional step 95, the number of non-null pixels in the binarized accumulated edge map is compared with a threshold value LOGO_MINIMUM_EDGE_PTS. If it is below the threshold value, then temporal coherence is checked (optional step 14) otherwise, the method continue with step 96.

In a step 96, the binarized accumulated edge map is filtered with a mean filter and peak locations in the filtered picture are identified.

In a step 98, the filtered picture is binarized to produce blobs representing areas of temporally accumulated static edges.

In a step 100, the blobs are processed. More precisely, the blobs containing the peak value in the filtered picture are identified. For each identified blob, the sum of values of corresponding pixels in the filtered picture is computed. The blob for which the sum value is the highest is then selected. The rectangular box that bounds the selected blob is the candidate logo bounding box. According to a variant, the surface, height and width of the rectangular box that bounds the selected blob are compared, in a step 102, with thresholds. If one of them is below the threshold value then the rectangular box is discarded.

Figure 12:
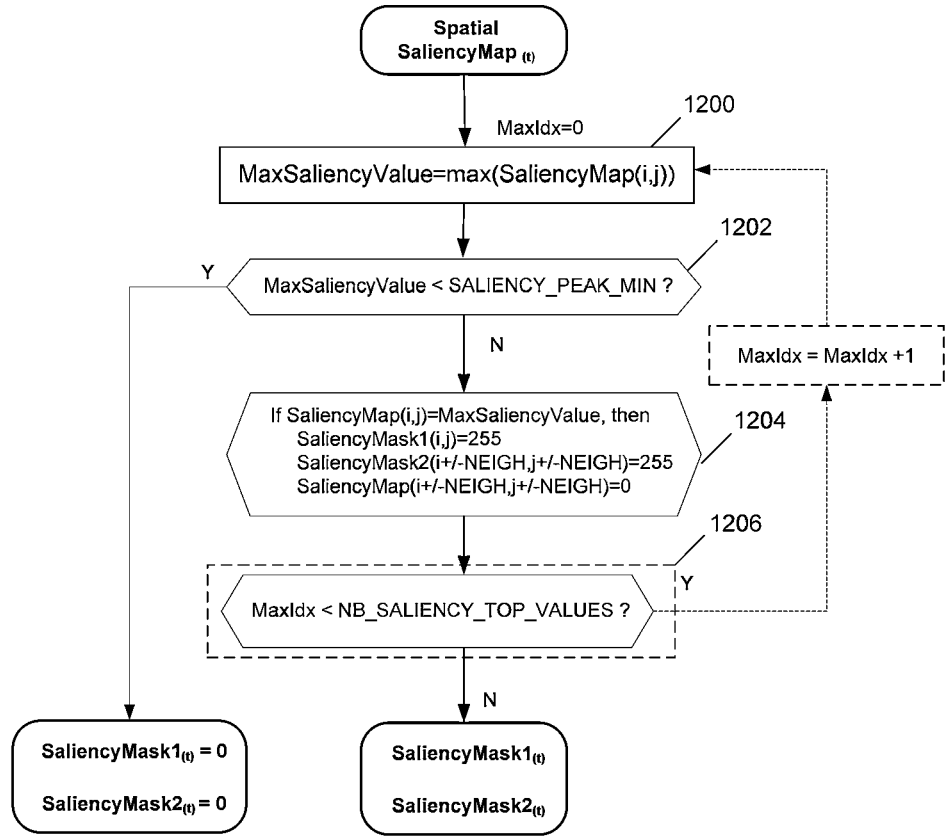
FIG. 12 represents the flowchart of a method for determining saliency masks according to the invention.

FIG. 12 represents the flowchart of a method for determining a saliency mask from a saliency map for the current picture. In a step 1200, the maximum value in the grayscale spatial saliency map is determined. In a step 1202, the maximum value is compared with a threshold value SALIENCY_PEAK_MIN. If the maximum value is below the threshold then it is considered that saliency information is too weak to be used. If not, then saliency masks are built at a step 1204. A binary picture SaliencyMask1 is built that indicates the locations of those pixels in the spatial saliency map that are equal to the maximum value. A second saliency mask is possibly built that considers a neighborhood of NEIGH pixels around each activated location in the first saliency mask. For computing score2 and score3 both of the saliency masks can be used. According to a variant, NB_SALIENCY_TOP_VALUES top saliency values are taken into account into a step 1206.

SaliencyMask1 is used preferentially to compute score3 and SaliencyMask2 is used to compute score2.

Figure 13:
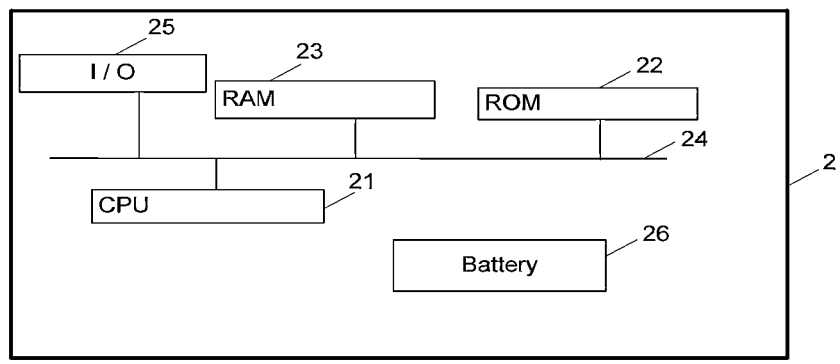
FIG. 13 represents a device for detecting the presence of a logo in a video.

FIG. 13 represents an exemplary architecture of a logo detector 2 according to a specific and non limiting embodiment. The logo detector is for example integrated into a tablet, a cell phone or a PDA. The logo detector 2 comprises following elements that are linked together by a data and address bus 24:

a microprocessor 21 (or CPU), which is, for example, a DSP (or Digital Signal Processor);
 a ROM (or Read Only Memory) 22;
 a RAM (or Random Access Memory) 23;
 one or several Input/Output interface(s) 25, for example a keyboard, a mouse; and
 a battery 26.

Each of these elements of FIG. 13 is well known by those skilled in the art and won't be disclosed further. The logo detector 2 may comprise display means such as a screen for displaying the processed pictures. In each of mentioned memory, the word <<register>> used in the specification can correspond to area of small capacity (some bits) or to very large area (e.g. a whole program or large amount of received or decoded data). Algorithm of the processing method according to the invention is stored in the ROM 22. RAM 43 comprises in a register, the program executed by the CPU 21 and uploaded after switch on of the processing device 2. When switched on, the CPU 21 uploads the program in the RAM and executes the corresponding instructions. The pictures to be processed are received on one of the Input/Output interfaces 25.

According to variants, logo detectors 2 compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The value of the scores (score1, score 2, and score3) are not necessary binary. They can instead take probability values. Indeed, using a binary value leads to a hard decision in the different steps where these scores are used. Using instead a probability value can provide a certain level of confidence on the decision and can make use of fuzzy logic approaches to make decisions at the different steps where these scores are used.

What is claimed is:

1. A method for detecting a presence of a logo in a current picture of a video comprising:
   determining a current candidate logo bounding shape in said current picture and a preceding candidate logo bounding shape in a picture preceding said current picture;
   calculating a first score value based at least partially on whether a distance between a center of said current and said preceding candidate logo bounding shapes is below a first threshold or whether an overlap between said current and said preceding candidate logo bounding shapes is above a second threshold;
   calculating a second score value based at least partially on whether an overlap between the current candidate logo bounding shape and a saliency mask of the current picture is above a third threshold, wherein the saliency mask identifies regions around saliency peaks; and
   detecting the presence of a logo in the current picture based at least partially on a comparison of the first score value and the second score value.

2. The method according to claim 1, wherein said candidate logo bounding shape is a candidate logo bounding box.

3. The method according to claim 2, further comprising,
   increasing a confidence level by N each time the presence of a logo is detected for a current picture of said video; and
   decreasing the confidence level by N each time the presence of a logo is not detected for a current picture, the presence of a logo being finally detected for the current picture when said confidence level is positive.

4. The method according to claim 3, wherein N equals 1.

5. The method according to claim 3, further comprising, increasing a value of N after several consecutive detections or non-detections are made.

6. The method according to claim 2, further comprising:
   checking whether the current candidate logo bounding box comprises a peak of saliency, when the presence of a logo is detected in the current picture; and
   adding said current candidate logo bounding box to a list of logo candidate bounding boxes, when the current candidate logo bounding box comprises the peak of saliency, the logo in said current picture being a bounding box computed from the list of candidate logo bounding boxes when said list comprises M candidate logo bounding boxes and the logo in said current picture being the current candidate logo bounding box otherwise.

7. The method according to claim 6, wherein M equals 10.

8. The method according to claim 2, wherein determining the current candidate logo bounding box comprises:
   computing an edge map for each picture of a detection window in at least one search area, said detection window comprising the current picture and P pictures preceding said current picture;
   summing edge maps over the pictures into an accumulated edge map and binarizing the accumulated edge map;
   filtering the binarized accumulated edge map into a filtered edge map;
   binarizing the filtered edge map to into a map of blobs;
   selecting, among the blobs containing pixels whose value in the filtered edge map is the highest, the blob containing the highest sum of pixel values in the filtered edge map ; and
   determining a box bounding the selected blob, said candidate bounding box being said bounding box.

9. The method according to claim 8, further comprising
   sliding said detection window by k pictures; and
   detecting a logo of a next picture, upon sliding said detection window.

10. The method according to claim 8, wherein said at least one search area comprises four corners of the current picture and top and bottom horizontal banners.

11. A device for detecting a presence of a logo in a current picture of a video comprising:
    a memory;
    at least one processor configured to:
    determine a current candidate logo shape in said current picture and a preceding candidate logo shape in a picture preceding said current picture;
    calculate a first score value based at least partially on whether a distance between a center of said current and said preceding candidate logo bounding shapes is below a first threshold or whether an overlap between said current and said preceding candidate logo bounding shapes is above a second threshold;
    calculate a second score value based at least partially on whether an overlap between the current candidate logo bounding shape and a saliency mask of the current picture is above a third threshold, wherein the saliency mask identifies regions around saliency peaks; and
    detect the presence of a logo in the current picture based at least partially on a comparison of the first score value and the second score value.

12. The device according to claim 11, wherein said candidate logo bounding shape is a candidate logo bounding box.

13. The device according to claim 12, wherein the at least one processor is further configured to increase a confidence level by N each time the presence of a logo is detected for a current picture of said video and to decrease said confidence level by N otherwise, the presence of a logo being finally detected for the current picture when said confidence level is positive.

14. The device according to claim 13, wherein N equals 1.

15. The device according to claim 13, wherein the at least one processor is further configured to increase a value of N after several consecutive detections or non-detections are made.

16. The device according to claim 12, wherein the at least one processor is further configured to:
    determine a logo in said current picture when the presence of said logo is detected;
    determine whether the current candidate logo bounding box comprises a peak of saliency; and
    add said current candidate logo bounding box to a list of logo candidate bounding boxes if the current candidate logo bounding box comprises the peak of saliency, the logo in said current picture being a bounding box computed from the list of candidate logo bounding boxes when said list comprises M candidate logo bounding boxes and the logo in said current picture being the current candidate logo bounding box otherwise.

17. The device according to claim 16, wherein M equals 10.

18. A non-transitory computer readable medium with instructions stored therein which, upon execution, instruct at least one processor to:
    determine a current candidate logo bounding shape in a current picture and a preceding candidate logo bounding shape in a picture preceding said current picture;
    calculate a first score value based at least partially on whether a distance between center of said current and said preceding candidate logo bounding shapes is below a first threshold or whether an overlap between said current and said preceding candidate logo bounding shapes is above a second threshold;

calculate a second score value based at least partially on whether an overlap between the current candidate logo bounding shape and a saliency mask of the current picture is above a third threshold, wherein the saliency mask identifies regions around saliency peaks; and detect a presence of a loqo in the current picture based at least partially on a comparison of the first score value and the second score value.

* * * * *